(12) United States Patent
MacDonald et al.

(10) Patent No.: US 7,890,657 B2
(45) Date of Patent: Feb. 15, 2011

(54) SYSTEM AND METHOD FOR CORRECT ROUTING AND ENFORCEMENT POLICY IN A NETWORK HAVING ADDRESS OR PORT TRANSLATION

(75) Inventors: Anthony MacDonald, Richmond (CA); Brian Stucker, Redmond, WA (US)

(73) Assignee: Genband US LLC, Plano, TX (US)

( * ) Notice: Subject to any disclaimer, the term of this patent is extended or adjusted under 35 U.S.C. 154(b) by 200 days.

(21) Appl. No.: 12/157,677

(22) Filed: Jun. 12, 2008

(65) Prior Publication Data

US 2009/0313385 A1 Dec. 17, 2009

(51) Int. Cl.
G06F 15/16 (2006.01)

(52) U.S. Cl. .................... 709/245; 709/227; 709/238

(58) Field of Classification Search ............ 709/223, 709/225–227, 238, 245
See application file for complete search history.

(56) References Cited

U.S. PATENT DOCUMENTS

| | | | | |
|---|---|---|---|---|
| 5,123,097 A * | 6/1992 | Joyce et al. | ............... | 712/218 |
| 6,058,431 A * | 5/2000 | Srisuresh et al. | ............... | 709/245 |
| 6,925,547 B2 * | 8/2005 | Scott et al. | ............... | 711/207 |
| 7,031,328 B2 * | 4/2006 | Thubert et al. | ............... | 370/401 |
| 7,124,273 B2 * | 10/2006 | Glew et al. | ............... | 711/202 |
| 7,295,532 B2 * | 11/2007 | Haller et al. | ............... | 370/328 |
| 7,333,500 B2 * | 2/2008 | Roshko | ............... | 370/401 |
| 7,334,049 B1 * | 2/2008 | Somasundaram et al. | ... | 709/245 |
| 7,349,348 B1 * | 3/2008 | Johnson et al. | ............... | 370/254 |
| 7,366,188 B2 * | 4/2008 | Kim | ............... | 370/401 |
| 7,548,743 B2 | 6/2009 | Cai et al. | | |
| 7,630,364 B2 * | 12/2009 | Stewart et al. | ............... | 370/389 |
| 7,752,334 B2 * | 7/2010 | Paunikar et al. | ............... | 709/245 |
| 2003/0009561 A1 * | 1/2003 | Sollee | ............... | 709/227 |
| 2003/0163662 A1 * | 8/2003 | Glew et al. | ............... | 711/202 |
| 2006/0002422 A1 | 1/2006 | Hurtta | | |
| 2006/0008063 A1 | 1/2006 | Harnesk et al. | | |

(Continued)

FOREIGN PATENT DOCUMENTS

WO    WO 03/040898 A1    5/2003

(Continued)

OTHER PUBLICATIONS

3rd Generation Partnership Project; Technical Specification Group Services and System Aspects; Telecommunication management; Charging management; Charging architecture and principles (Release 6); 3GPP TS 32.240 V6.0.0 (Sep. 2004).

(Continued)

*Primary Examiner*—Faruk Hamza
(74) *Attorney, Agent, or Firm*—Jenkins, Wilson, Taylor & Hunt, P.A.

(57) ABSTRACT

The present invention incorporates an intermediary proxy rules device that has access to information regarding network address and port bindings or network address and port translations. This intermediary function communicates translated address information to other devices on the network, such as the policy and charging rule function and policy and charging enforcement function. The full communication and coordination of this information coordinates correct translation address information and other necessary information to these PCRF and PCEF devices, which eliminates many of the problems associated with the session set-up and maintenance with other networks.

21 Claims, 1 Drawing Sheet

U.S. PATENT DOCUMENTS

| | | | |
|---|---|---|---|
| 2007/0053361 A1* | 3/2007 | Chen et al. | 370/392 |
| 2007/0094411 A1* | 4/2007 | Mullane et al. | 709/245 |
| 2008/0013533 A1* | 1/2008 | Bogineni et al. | 370/389 |
| 2008/0159313 A1* | 7/2008 | Rasanen | 370/401 |

FOREIGN PATENT DOCUMENTS

| | | |
|---|---|---|
| WO | WO 2004/004301 A1 | 1/2004 |
| WO | WO 2005/050917 A2 | 6/2005 |
| WO | WO 2007/079682 A1 | 7/2007 |

OTHER PUBLICATIONS

3rd Generation Partnership Project; Technical Specification Group Service and System Aspects; Telecommunication management; Charging management; Diameter charging applications (Release 6); 3GPP TS 32.299 V6.0.0 (Sep. 2004).

3.sup.rd Generation Partnership Project; Technical Specification Group Services and Systems Aspects; Telecommunication mangagement; Charging management; Charging principles (Release 5); 3GPP TS 32.200 v5.7.0 (Jun. 2004).

3.sup.rd Generation Partnership Project; Technical Specification Group Service and System Aspects; Telecommunication management; Online Charging System (CS): Applications and Interfaces (Releases 6); 3GPP TS 32.296 v.1.8.1 (Sep. 2004).

3.sup.rd Generation Partnership Project; Technical Specification Group Services and System Aspects; IP Multimedia Subsystem (IMS); Stage 2 (Release 6); 3GPP TS 23.228 v6.4.1 (Jan. 2004).

* cited by examiner

SYSTEM AND METHOD FOR CORRECT ROUTING AND ENFORCEMENT POLICY IN A NETWORK HAVING ADDRESS OR PORT TRANSLATION

TECHNICAL FIELD OF THE INVENTION

A method for correctly applying policy within a multimedia communications network in the presence of network address or port translation.

BACKGROUND OF THE INVENTION

Present-day Internet communications represent the synthesis of technical developments begun in the 1960s. During that time period, the Defense Department developed a communication system to support communication between different United States military computer networks, and later a similar system was used to support communication between different research computer networks at United States universities.

The Internet

The Internet, like so many other high tech developments, grew from research originally performed by the United States Department of Defense. In the 1960s, Defense Department officials wanted to connect different types of military computer networks. These different computer networks could not communicate with each other because they used different types of operating systems or networking protocols.

While the Defense Department officials wanted a system that would permit communication between these different computer networks, they realized that a centralized interface system would be vulnerable to missile attack and sabotage. To avoid this vulnerability, the Defense Department required that the interface system be decentralized with no vulnerable failure points.

The Defense Department developed an interface protocol for communication between these different network computers. A few years later, the National Science Foundation (NSF) wanted to connect different types of network computers located at research institutions across the country. The NSF adopted the Defense Department's interface protocol for communication between the research computer networks. Ultimately, this combination of research computer networks would form the foundation of today's Internet.

Internet Protocols

The Defense Department's interface protocol was called the Internet Protocol (IP) standard. The IP standard now supports communication between computers and networks on the Internet. The IP standard identifies the types of services to be provided to users and specifies the mechanisms needed to support these services. The IP standard also describes the upper and lower system interfaces, defines the services to be provided on these interfaces, and outlines the execution environment for services needed in this system.

A transmission protocol, called the Transmission Control Protocol (TCP), was developed to provide connection-oriented, end-to-end data transmission between packet-switched computer networks. The combination of TCP with IP (TCP/IP) forms a system or suite of protocols for data transfer and communication between computers on the Internet. The TCP/IP standard has become mandatory for use in all packet switching networks that connect or have the potential for utilizing connectivity across network or sub-network boundaries.

A computer operating on a network is assigned a unique physical address under the TCP/IP protocols. This is called an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a sensible addressing scheme that reflects the internal organization of the network or sub-network. All information packets transmitted over the Internet will have a set of IP header fields containing this IP address.

A router is located on one or more networks, and routers are used to regulate the transmission of information packets into and out of computer networks and within sub-networks. Routers are referred to by a number of names including Home Agent, Home Mobility Manager, Home Location Register, Foreign Agent, Serving Mobility Manager, Visited Location Register, and Visiting Serving Entity. A router interprets the logical address of an information packet and directs the information packet to its intended destination.

The TCP/IP network includes protocols that define how routers will determine the transmittal path for data through the network. Routing decisions are based upon information in the IP header and entries maintained in a routing table. A routing table possesses information for a router to determine whether to accept the communicated information packet on behalf of a destination computer or pass the information packet onto another router in the network or sub-network. The routing table's address data enables the router to accurately forward the information packets.

The routing table can be configured manually with routing table entries or with a dynamic routing protocol. In a dynamic routing protocol, routers update routing information with periodic information packet transmissions to other routers on the network. This is referred to as advertising. The dynamic routing protocol accommodates changing network topologies, such as the network architecture, network structure, layout of routers, and interconnection between hosts and routers.

The IP-Based Mobility System

The Internet protocols were originally developed with an assumption that Internet users would be connected to a single, fixed network. With the advent of portable computers and cellular wireless communication systems, the movement of Internet users within a network and across network boundaries has become common. Because of this highly mobile Internet usage, the implicit design assumption of the Internet protocols has been violated.

In an IP-based mobile communication system, the mobile communication device (e.g. cellular phone, pager, computer, etc.) is called User Equipment. User Equipment is sometimes called a mobile node, mobile unit, mobile terminal, mobile device, or similar names depending on the nomenclature adopted by particular system providers. User equipment could also include fixed equipment that does not move from its home network, such as a desktop computer.

User Equipment may change its point of attachment to a foreign network while maintaining connectivity to its home network. User Equipment may also change its point of attachment between sub-networks in its home network or foreign network. The mobile node will always be associated with its home network and sub-network for IP addressing purposes and will have information routed to it by routers located on the home and foreign network. Generally, there is also usually a correspondence node, which may be mobile or fixed, communicating with the mobile node.

IP Mobility and Care-Of Addressing Protocols

In a mobile IP network, nodes will transmit notification and discovery information packets onto the network to advertise their presence on the network and solicit advertisements from other nodes. While on a foreign network, User Equipment will be assigned a care-of address that will be used to route information packets to the foreign network and the attached mobile node. An advertisement from a router on the foreign network will inform User Equipment that is attached to a foreign network.

The mobile node will typically create a care-of address on the foreign network, which it will transmit to its home network in an information packet to register the care-of address. Information packets addressed to the mobile node on the home network have the care-of address added. This information packet containing the care-of address will then be forwarded and routed to the mobile node on the foreign network by a router on the foreign network according to the care-of address.

Application of Policy in Multimedia Networks

Policy is used to control how different types of IP traffic are treated within multimedia networks. This may include the application of particular charging rules, or the quality of service provided to the given traffic by the network routers. Quality of service includes the blocking of unauthorized traffic, and if incorrect policies are applied to traffic, the quality of service rules may dictate blocking of traffic instead of allowing the traffic to flow.

In order for the correct policy to be applied to a given traffic flow, the IP packets belonging to that flow must be properly recognized. This process is called classification. Classification uses a description of the traffic called a classifier to assist with this process. A classifier is also known as a traffic filter or flow description. A classifier typically contains such attributes as Source IP Address, Destination IP Address, Source IP Port, Destination IP Port, and Protocol, and may contain additional attributes.

Classification is performed at a policy enforcement function. In order for the policy enforcement process to be successful, the addresses and ports used to construct the classifier must match the addresses and ports that will be used to route the IP packets as they appear at the policy enforcement function. IP packets received by the policy enforcement function which have IP routing headers containing fields which match all of the relevant fields of a given classifier are classified correctly and the proper rules are applied to those packets.

The application of policy in IP multimedia networks is generally distributed between an Application Function (AF), a Policy and Charging Rules Function (PCRF) and a Policy and Charging Enforcement Function (PCEF). The Application Function (AF) is directly involved in the establishment of multimedia sessions. A Policy and Charging Rules Function (PCRF) receives information about session establishment from the AF and applies operator defined business policy. And, a Policy and Charging Enforcement Function (PCEF) is directly involved in the media path and is ultimately responsible for enforcing policy and charging rules.

Examples of an AF include voice over IP soft-switches, IMS call session control function (CSCF) or application server (AS). A PCRF is also known as a policy decision function (PDF), policy decision point (PDP) or simply as a policy function (PF). A PCEF is also known as a policy enforcement point (PEP) or policy enforcement function (PEF). Each of these devices require accurate address information to operate on the distributed policy architecture.

Network Address Translation

Network address translation devices, sometimes called network address and port translation devices, are often integrated into session border controller devices or application layer gateway devices. These session border controller devices are located on the border of a private network and a public network, and the network address translation devices function by replacing the local source address for the mobile node sending an outgoing packet with the public source IP address for the public network. A reverse translation occurs when a packet meant for transmission to the mobile node is received by the network address translation device or the session border controller device.

The network supporting communications to the mobile node (and having a network address translators and session border controller devices) may also possess devices that control rules, charging, and policies established for transmissions associated with the mobile node. There are control rules, charging and policy devices, often called the Policy Control and Charging Rules Function (PCRF) and the Policy Control and Charging Enforcement Function (PCEF), that control and support these rules and policies on the network. The rules and policies associated with User Equipment are applied based on the mobile node's source address. Difficulties arise when these other devices on the network are asked to apply rules and policies based on translated addresses, as opposed to the mobile node's actual source address. When the PCEF does not receive communication of addressing translations, there is a need for coordinated information to assist in the uniform policy enforcement and packet forwarding of transmissions.

For instance, multimedia communications may be requested by User Equipment. These multimedia communications are coordinated with a device called the Proxy Call Session Control Function (PCSCF) located on a separate network that supports the service providers for the network multimedia content providers. The PCSCF is often provided with a translated address that has been modified by the network and port translation device or the session border controller device during the session set-up.

The PCSCF must use translated address information to communicate with PCRF and PCEF functions, but these devices may only possess the mobile node's actual source address—not the translated address provided to the PCSCF. The translated address for the mobile node has not been effectively communicated to these other devices on the network. The lack of coordination and communication of translated address information in the session set-up creates several problems, such as the following: (1) media packets being routed to incorrect destinations, (2) policy requests being routed to incorrect policy enforcement devices (PCEF), (3) mismatched addresses and ports that are not recognized by traffic filters and classifiers applied in the policy enforcement devices (PCEF), and (4) lack of corresponding flow descriptions where policy rendezvous is used. There is a need to more accurately coordinate the correct application of policy in networks where network address translation and network address and port translation functions are present.

SUMMARY OF THE INVENTION

The present invention incorporates an intermediary proxy rules device that has access to information regarding network address and port bindings or network address and port translations. This intermediary function communicates translated address information to other devices on the network, such as the policy and charging rule function and policy and charging enforcement function. The role of this intermediary function is to update all relevant addresses contained in the session related policy signaling to reflect the network address and port mappings that are being applied to the media path.

The full communication and coordination of this information coordinates correct translation address information and other necessary information to these PCRF and PCEF devices, which eliminates many of the problems associated with the session set-up and maintenance with other networks.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
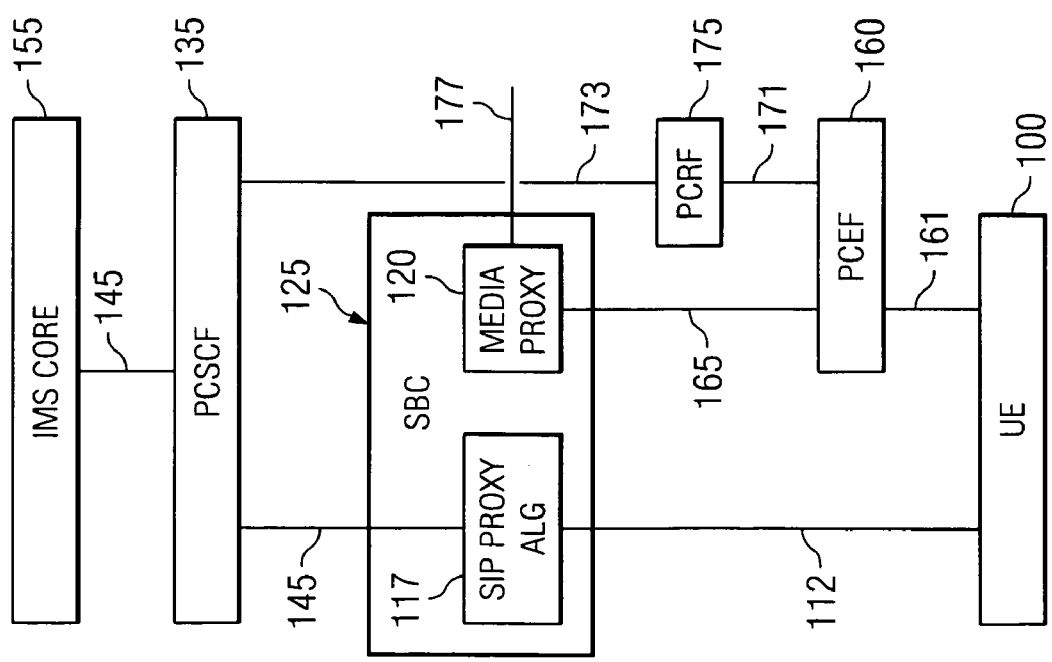
FIG. 1 is a prior art schematic diagram of a communication network.

FIG. 1 shows an exemplary embodiment for an IP multimedia communication where the user equipment (UE) 100 is coupled to the session border controller (SBC) 125 by the SIP communication link 112. The SBC 125 has an SIP Proxy ALG 117 and a Media Proxy 120.

The SIP Proxy ALG 117 includes a network address translation device, and the SIP Proxy ALG 117 is coupled by link 146 to the Proxy Call Session Control Function (PCSCF) 135 for a network that supports the multimedia communications support servers and IP Multimedia Subsystem (IMS Core) 155. The PCSCF 135 is coupled to the IMS Core 155 by communication link 145. Translated addresses are provided to the PCSCF 135 by the session border controller [125], and these translated addresses are used by PCSCF 135 to communicate to other devices.

The user equipment (UE) 100 is also coupled to the Policy Control and Charging Enforcement Function (PCEF) 160 via link 161, and the Policy Control and Charging Enforcement Function (PCEF) 160 is coupled to the Policy Control and Charging Rules Function (PCRF) 175 through a Diameter Rx/Gx communication link 171. The PCEF 160 recognizes the mobile node's actual source address, but the PCEF 160 is not provided with a correlation of the mobile node's actual source address versus the translated address for the mobile node as translated by the SBC 125.

The PCRF 175 is linked to the PCSCF 135 via Diameter Rx/Gx communication link 173, and communications related to the mobile node include the translated address, which is in turn communicated to the PCEF 160. The Media Proxy 120 receives and transmits the multimedia content along real-time communication link 177, and these communications are meant to be transmitted to the user equipment (UE) 100 through the PCEF 160 and the real-time communication links 165 and 161, respectively. The multimedia content, however, includes the translated source address as the destination address, but the PCEF 160 cannot correlate the translated address with the actual mobile node address because there that correlation has not been communicated to it previously. The lack of communication of the translated address and its correlation to the mobile node's actual source address creates a problem with proper packet forwarding and policy enforcement for packets destined for the user equipment (UE) 100. For instance, the PCEF 160 may apply the incorrect policy to a packet received with a translated address for the mobile node 100 because it does not recognize the translated address as being correlated to the mobile node's 100 actual source address.

Figure 2:
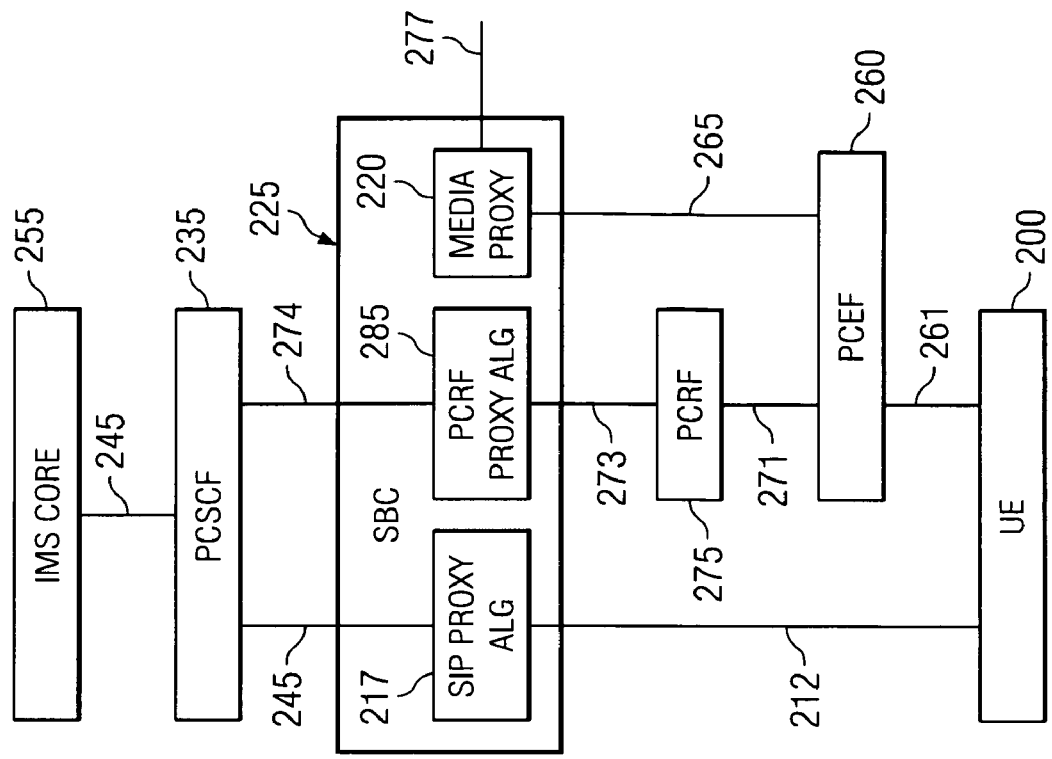
FIG. 2 is a schematic diagram of a communication network.

FIG. 2 shows an exemplary embodiment for an IP multimedia communication where the user equipment (UE) 200 is coupled to the session border controller (SBC) 225 by the SIP communication link 212. The SBC 225 has an SIP Proxy ALG 217 and a Media Proxy 220, but it also possess a PCRF Proxy ALG 285 device function.

The SIP Proxy ALG 217 includes a network address translation device, and the SIP Proxy ALG 217 is coupled by link 246 to the Proxy Call Session Control Function (PCSCF) 235 for a network that supports the multimedia communications support servers and IP Multimedia Subsystem (IMS Core) 255. The PCSCF 235 is coupled to the IMS Core 255 by communication link 245. Translated addresses are provided to the PCSCF 235 by the session border controller 215, and these translated addresses are used by PCSCF 235 to communicate to other devices.

The user equipment (UE) 200 is coupled to the Policy Control and Charging Enforcement Function (PCEF) 260 via link 261, and the Policy Control and Charging Enforcement Function (PCEF) 260 is coupled to the Policy Control and Charging Rules Function (PCRF) 275 through a Diameter Rx/Gx communication link 271.

The PCRF 175 is linked to a PCRF Proxy ALG 285 via Diameter Rx/Gx communication link 273, and the PCRF Proxy ALG 285 is coupled to the PCSCF 235 via Diameter Rx/Gx communication link 274 to the PCSCF 235. The PCRF 275 and the PCEF 260 are provided with the translated address and port bindings for the mobile node as translated by the SBC 225 in the invention because the PCRF Proxy ALG 285 provides that translated address information, port bindings, and the correlation to the mobile node address to those devices. As such, with the PCRF Proxy ALG 285, the PCEF 260 recognizes the mobile node's actual source address and the correct policies to apply to packets addressed for the mobile node (even containing translated addresses) because the PCEF 260 also can correlate the translated address and port information with the mobile node's actual source address.

The Media Proxy 220 receives and transmits the multimedia content along real-time communication link 277, and these communications are meant to be transmitted to the user equipment (UE) 200 through the PCEF 260 and the real-time communication links 265 and 261, respectively. The multimedia content includes the translated source address as the destination address, but the present invention allows the PCEF 260 to correlate the translated address with the actual mobile node address and apply the correct policies to that packet (even with a translated address or port binding) because there that correlation of address and port binding information has been communicated to it previously by the PCRF Proxy ALG 285 and the PCRF 275. The communication of the translated address and its correlation to the mobile node's actual source address resolves many of the problems associated with proper packet forwarding and correct policy enforcement for packets destined for the user equipment (UE) 200.

Having described the invention, we claim:

1. A system for supporting the transmission of multimedia communications, comprising:

a session initiation protocol (SIP) proxy for interfacing with a user equipment device, said SIP proxy including a network address translation device for translating an actual address of the user equipment device in an information packet into a translated address which is used to support media communications for transmission to the user equipment device;

a media proxy that receives media communications addressed to the translated address for the user equipment device, said media communications being provided to a policy control and charging enforcement function (PCEF) device for forwarding and policy enforcement of the media communication;

a proxy rules and charging function (PCRF) proxy for communicating a correlation between the user equipment device's actual address and the user equipment device's translated address to the PCEF device wherein, the PCEF device uses the translated address for proper forwarding and policy enforcement of media communications to be transmitted to the user equipment device.

2. The support system of claim 1 wherein the PCRF proxy is coupled to a PCRF device, which is coupled to the PCEF device.

3. The support system of claim 1 wherein the SIP proxy is coupled to a proxy call session control function (PCSCF) device that receives the translated user equipment address and uses that translated address to support the media communications.

4. The support system of claim 3 wherein the PCRF proxy is coupled to said PCSCF device.

5. The support system of claim 4 wherein the PCRF proxy is coupled to a PCRF proxy device, which is coupled to the PCEF device.

6. The support system of claim 1 wherein the SIP proxy is coupled to a proxy call session control function (PCSCF) device that receives the translated address and uses the translated address to support the media communications.

7. The support system of claim 6 wherein the PCRF proxy is coupled to said PCSCF device.

8. The support system of claim 7 wherein the PCRF proxy is coupled to a PCRF device, which is coupled to the PCEF device.

9. The support system of claim 1 wherein the SIP proxy, the PCRF proxy, and the media proxy are components of a session border controller (SBC).

10. A system for supporting multimedia communications on a network, comprising:

a session initiation protocol (SIP) proxy for communicating with a user equipment device and including a network address translation device for providing a translation of an actual address of the user equipment device in an information packet into a translated address which is used to support media communications to the user equipment device;

a media proxy that receives media communications to be transmitted to the user equipment device, said media communications being provided to a policy control and charging enforcement function (PCEF) device;

a proxy rules and charging function (PCRF) proxy for communicating a correlation between the user equipment device's actual address and the user equipment device's translated address to the PCEF device, wherein said PCEF device uses the translated address for proper forwarding and policy enforcement of media communications to the user equipment device.

11. The support system of claim 10 wherein the PCRF proxy is coupled to a PCRF device, which is coupled to the PCEF device.

12. The support system of claim 10 wherein the SIP proxy is coupled to a proxy call session control function (PCSCF) that receives the translated address and uses that translated address to support the media communications.

13. The support system of claim 12 wherein the PCRF proxy is coupled to a PCRF device, which is coupled to the PCEF device.

14. The support system of claim 12 wherein the PCRF proxy is coupled to said PCSCF device.

15. The support system of claim 14 wherein the PCRF proxy is coupled to a PCRF device, which is coupled to the PCEF device.

16. The system of claim 10 wherein the SIP proxy, the PCRF proxy, and the media proxy are components of a session border controller (SBC).

17. A method for providing support for multimedia communications on a network, comprising the steps of:

transmitting an information packet from a user equipment device to a session initiation protocol (SIP) proxy, translating an actual address of the user equipment device in an information packet into a translated address which is used to prepare media communications for transmission to the user equipment device;

correlating the user equipment device's actual address and the translated address;

communicating the correlation of the actual address and translated address for the user equipment device from a proxy rules and charging function (PCRF) proxy to a policy control and charging enforcement function (PCEF) device;

receiving media communications at a media proxy, said media communications being addressed to the translated address for the user equipment device;

transmitting said media communications to said PCEF device for forwarding to the user equipment and application of correct policy enforcement, said PCEF device using the correlation address information to assist with the forwarding of the multimedia communications through the application of correct policy.

18. The method for supporting multimedia communications of claim 17 wherein PCRF proxy is coupled to a PCRF device, which is coupled to the PCEF device.

19. The method for supporting multimedia communications of claim 17 wherein the SIP proxy is coupled to a proxy call session control function (PCSCF) device that receives the translated user equipment address and uses that translated address to support the media communications.

20. The method for supporting multimedia communications of claim 19 wherein PCRF proxy is coupled to said PCSCF device.

21. The method for supporting multimedia communications of claim 17 wherein the SIP proxy, the PCRF proxy, and the media proxy are components of a session border controller (SBC).

* * * * *